Patented July 6, 1943

2,323,344

UNITED STATES PATENT OFFICE

2,323,344

PROCESS OF BREAKING PETROLEUM EMULSIONS AND BREAKING AGENT

August Moeller, Frankfort-on-the-Main-Griesheim, Germany, Hans Tochtermann, deceased, late of Mannheim, Germany, by Hilde Tochtermann, administratrix, Eisleben, Germany, and Otto Trösken, Frankfort-on-the-Main-Fechenheim, Germany; vested in the Alien Property Custodian No Drawing. Application September 17, 1940, Serial No. 357,146. In Germany March 18, 1939

8 Claims. (Cl. 252—338)

The present invention relates to breaking agents for emulsions from crude petroleum and salt water and to the breaking process itself.

Crude petroleum often approaches the surface not in the form of an anhydrous oil, but as an emulsion wherein water is more or less finely subdivided. The water may come from the mineral deposit where it is found with the oil and is brought up; but the water may also enter the crude petroleum owing to leakage of the wells. The water then intimately mixes with the oil in the rising pipe, particularly if the oil well ceases to flow and the oil must be raised by pumping. By the action of substances present in the crude petroleum which in most cases are not known in detail it occurs that the water is finely subdivided in the oil and stable emulsions are formed so that even after a prolonged standing at ordinary or a raised temperature the water can no longer be separated from the oil. Even on centrifuging the emulsion in very rapidly rotating centrifugal machines, a separation is often not possible and other processes have to be applied for separating for a subsequent refining oil and water from each other. In the distillation devices water is a troublesome phenomenon, particularly if salts are contained therein. The salts essentially consist of sodium chloride; moreover calcium chloride and magnesium chloride may also be present.

Sometimes it is possible to separate the stable emulsions with the aid of the electric high tension field; in most cases, however, there are applied the processes of breakage by means of chemical reagents which processes are much simpler and more suitable in the plants for the extraction of petroleum. These processes consist in adding to the emulsion of crude mineral oil and intimately mixing therewith an agent causing or accelerating the separation into water and oil and then allowing the mixture to stand at a raised temperature, for instance at 50° C. to 80° C. According to the special conditions the emulsion is then broken after a few hours up to after about 24 hours. On operating in the correct way it is possible to dehydrate to a large extent the crude mineral oil which unhesitatingly may then be passed into the distillation plant.

As additional agents for the breakage a number of sulfonation products has already been suggested, for instance petroleum sulfonates and sulfonated castor oil, furthermore sulfonated derivatives of fatty acid amides of the general formulae:

(I) 

wherein R—CO stands for the radical of a higher fatty acid, Y for hydrogen, an alkyl, aryl or aralkyl radical and R' stands for an alkyl, aryl or aralkyl radical which carries a sulfo group Z in the form of a free acid or a salt.

(II) Compounds of the general Formula I, but wherein only Y and R' constitute more complicated, partly sulfonated hydrocarbon radicals of which at least one contains a hydroxyl group.

(III) 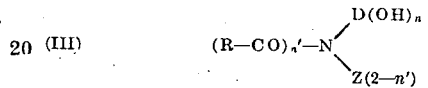

wherein $n$ and $n'$ stand for the numbers 1 or 2, D stands for an alkyl, aryl or aralkyl radical which may carry one or two substituents, Z stands for a hydrogen atom, an alkyl, aryl or aralkyl radical and R—CO again for a fatty acid radical which if necessary may contain also a sulfo group.

Now we have found that sulfonated fatty acid amides of the general formula

wherein X stands for —O—$SO_3$.Y or —$SO_3$.Y, Y standing for hydrogen, an alkali metal or an alkaline earth metal, $NH_4$ or a radical of a quaternary ammonium compound, R stands for an aliphatic radical containing at least 9 carbon atoms, $R_1$ stands for hydrogen, alkyl, aryl, aralkyl or cycloalkyl, $R_2$ stands for alkyl, aryl, aralkyl or cycloalkyl and $R_1$ and $R_2$ together may stand for members of a ring, are excellently suitable for breaking petroleum emulsions.

As sulfonated, substituted fatty acid amides which may be used according to the present invention there may be named for instance the sulfuric acid ester of oleic acid dimethyl-amide, the sulfuric acid ester of oleic acid ethyl-anilide, the sulfuric acid ester of oleic acid di-iso-heptyl-amide or the genuine sulfonic acid of oleic acid di-isobutyl-amide and others. It may be pointed out that all the compounds named above are free from hydroxyl groups and that the sulfuric acid radical is in no case situated at one of the radicals designated by $R_1$ and $R_2$.

Such an extraordinary efficacity and, contrary to the compounds of the general Formula III, such a general utility of the new compounds could not be foretold. These compounds may be easily obtained by causing sulfonating agents to act upon the corresponding, substituted fatty acid amides, which means a relatively simpler manner and in consequence thereof a cheaper price than the products of the Formulae I to III.

Already the sulfonated fatty acid amides of the formula $$R.X.CO.NH_2$$

have a low breaking effect. According to the present invention this breaking power is, however, quite disproportionately increased in replacing the hydrogen atoms in the amide by hydrocarbon radicals.

The derivatives of the sulfonated fatty acid amides named may be used in the form of industrial products i. e. with a certain content of non-sulfonated portions or of free fatty acids. Owing to the presence of a sulfo group in the fatty acid radical they may also be used in the form of their alkali metal salts, ammonium salts or salts of the alkaline earth metals; their use in the form of salts of quarternary ammonium compounds is particularly advantageous.

As already mentioned, the new agents for breaking emulsions are not only of a very general utility but they exceed so essentially the known breaking agents that only with the aid of the new breaking agents it has become possible to separate emulsions of crude petroleum which according to other processes and by means of other breaking agents could hitherto not been broken in a technical scale.

The quantities of the new agents necessary for breaking emulsions of crude petroleum are very small. The new agents may be applied in a quantity between about 50 grams and 1000 grams per ton of crude petroleum. The quantity required for the complete dehydration of the emulsion depends primarily on the content of water and the distribution of the water. The higher the content of water and the smaller the droplets of water distributed in the oil, the higher is in general the addition required of breaking agent. The age of the emulsion is likewise of a certain influence. The stability of the emulsion increases pari passu with the storing; the quantities of the additions required for the breaking are, therefore, often considerably greater so that the breaking directly after the extraction of the crude petroleum at the well is possible with smaller quantities of the additional product than those required after a storing of several days or even longer.

The following examples serve to illustrate the invention, but they are not intended to limit it thereto;

(1) An emulsion of crude petroleum of Roumanian origin containing 38.4 per cent of water and 64.4 kilograms of salt per ton of emulsion was mixed at 60° C. with 300 grams of the sodium salt of an industrial sulfuric acid ester of oleic acid ethylanilide per ton of crude petroleum. The sodium salt has the following formula:

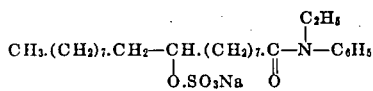

After a few hours the salt water had entirely separated.

(2) Into an emulsion of German crude petroleum of the Hanoverian district and containing 73 per cent of water and 134.8 kilograms of salt per ton of emulsion there were introduced while mixing 200 grams of the sodium salt of the sulfuric acid ester of oleic acid dimethyl amide per ton of emulsion. After a few hours 95 per cent of the water had separated at 50° C. from the emulsion, and after about 24 hours the separation was complete.

(3) An emulsion of crude petroleum of Roumanian origin containing 38.4 per cent of water and 6.44 per cent of salt was mixed at 50° C. with 400 grams of the sodium salt of the genuine sulfonic acid of the oleic acid di-isobutylamide per ton of emulsion. The sodium salt has the following formula:

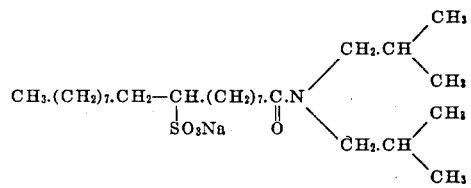

After a few hours the emulsion had completely separated into water and oil.

(4) The same emulsion of crude petroleum as described in Example 3 was treated under the same conditions with 400 grams of the sodium salt of the sulfuric acid ester of oleic acid di-isoheptyl-amide per ton of emulsion. The success was the same as in Example 3.

(5) The same emulsion of Roumanian crude petroleum as used in Examples 3 and 4 was mixed under the same conditions as those of the said examples with 400 grams of a salt from the sulfuric acid ester of oleic acid dimethyl-amide with tri-isopropylbenzyl-trimethyl-ammonium per ton of emulsion. The salt mentioned has the following formula:

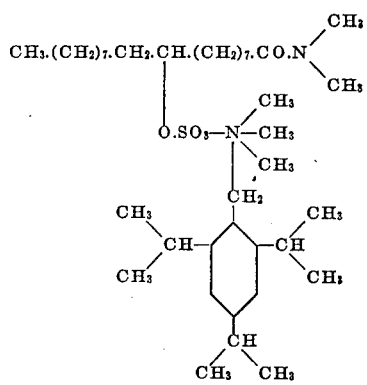

The breaking occurred just as rapidly and completely as that of Examples 3 and 4.

(6) An emulsion of crude petroleum of Roumanian origin which in spite of the relatively small content of water could be broken only with great difficulty and which contained 9 per cent of water and 0.81 per cent of salt could be completely dehydrated at 50° C. within 24 hours with 200 grams of the sodium salt of the sulfuric acid ester of oleic acid di-isobutyl-amide per ton of emulsion.

(7) An emulsion of German crude petroleum from the Hanoverian district and containing 60 per cent of water and 11.6 per cent of salt was completely dehydrated at 50° C. within 24 hours with 100 grams of the sodium salt of the sulfuric acid ester of oleic acid (2.6.-)-xylidide per ton of emulsion and within 2 to 3 hours with 300 grams of the said salt per ton of emulsion. The sodium salt has the following formula:

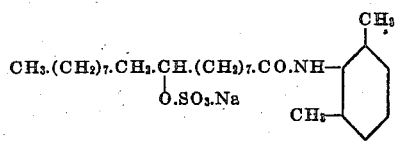

(8) In an emulsion of German crude petroleum from the petroleum district of Baden and containing 25 per cent of water and 0.98 per cent of salt the salt water was very finely subdivided so that the emulsion could be broken only with extreme difficulty. A breaking with the known breaking agents could, therefore, not be carried through. The emulsion could be completely dehydrated in less than 12 hours with 800 grams of a salt from sulfonated oleic acid di-isobutyl-amide with tri-isopropyl-benzyl-trimethyl-ammonium. The afore-named salt has the following formula:

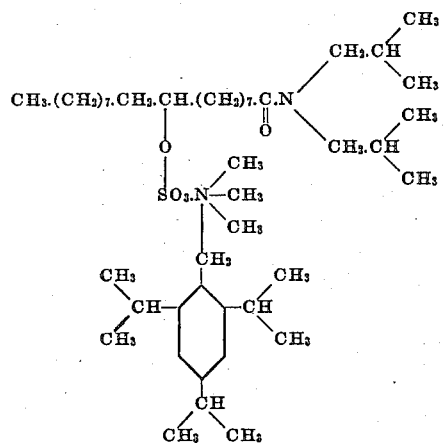

(9) An emulsion of crude petroleum of Roumanian origin and containing 50 per cent of water and 7.48 per cent of sodium chloride was completely decomposed at 50° C. within a few hours into the two phases by means of 400 grams of the sulfonated oleic acid piperidide per ton of emulsion.

We claim:

1. A breaking agent for emulsions from crude petroleum and salt water consisting of the compound of the following formula:

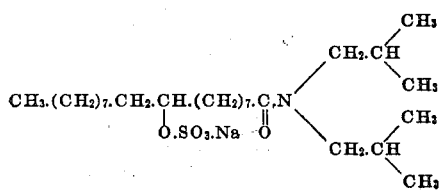

2. A breaking agent for emulsions from crude petroleum and salt water consisting of the compound of the following formula:

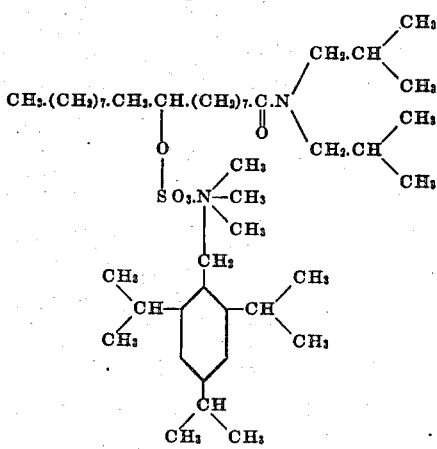

3. A process for breaking emulsions from crude petroleum and salt water which comprises subjecting the emulsion to the action of the compound of the following formula:

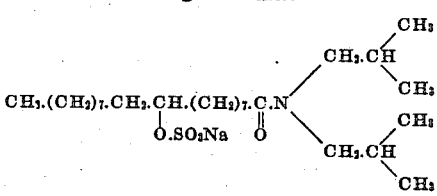

4. A process for breaking emulsions from crude petroleum and salt water which comprises subjecting the emulsion to the action of the compound of the following formula:

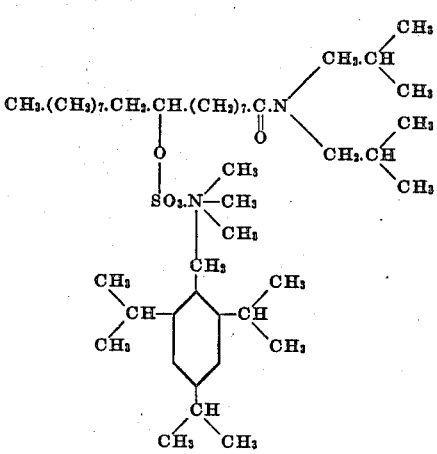

5. A breaking agent for emulsions from crude petroleum and salt water consisting of a compound of the general formula

wherein X stands for a member of the group consisting of —O—SO₃Y and —SO₃Y, Y standing for a member of the group consisting of hydrogen, alkali metals, alkaline earth metals, ammonium and radicals of a quaternary ammonium compound, R is an aliphatic radical with at least 9 carbon atoms, and R₁ and R₂ stand for aliphatic hydrocarbon radicals.

6. A process for breaking emulsions from crude petroleum and salt water which comprises subjecting the emulsion to the action of a compound of the general formula

wherein X stands for a member of the group consisting of —O—SO$_3$Y and —SO$_3$Y, Y standing for a member of the group consisting of hydrogen, alkali metals, alkaline earth metals, ammonium and radicals of a quaternary ammonium compound, R is an aliphatic radical with at least 9 carbon atoms, and R$_1$ and R$_2$ stand for aliphatic hydrocarbon radicals.

7. A breaking agent for emulsions from crude petroleum and salt water consisting of a compound of the general formula

wherein X stands for a member of the group consisting of —OSO$_3$Y and —SO$_3$Y, Y standing for a radical of a quaternary ammonium compound, R is an aliphatic radical with at least 9 carbon atoms, R$_1$ stands for a member of the group consisting of hydrogen, alkyl, aryl, aralkyl, cycloalkyl and R$_2$ stands for a member of the group consisting of alkyl, aryl, aralkyl and cycloalkyl.

8. A process for breaking emulsions from crude petroleum and salt water which comprises subjecting the emulsion to the action of a compound of the general formula

wherein X stands for a member of the group consisting of —OSO$_3$Y and —SO$_3$Y, Y standing for a radical of a quaternary ammonium compound, R is an aliphatic radical with at least 9 carbon atoms, R$_1$ stands for a member of the group consisting of hydrogen, alkyl, aryl, aralkyl, cycloalkyl and R$_2$ stands for a member of the group consisting of alkyl, aryl, aralkyl and cycloalkyl.

AUGUST MOELLER.
HILDE TOCHTERMANN,
As Administratrix of Hans Tochtermann, Deceased.

OTTO TRÖSKEN.